(12) United States Patent
McCain et al.

(10) Patent No.: US 11,741,065 B2
(45) Date of Patent: Aug. 29, 2023

(54) HARDWARE, FIRMWARE, AND SOFTWARE ANOMALY HANDLING BASED ON MACHINE LEARNING

(71) Applicant: International Business Machines Corporation, Armonk, NY (US)

(72) Inventors: Edward C. McCain, Lagrangeville, NY (US); Jeffrey Nettey, Pleasant Valley, NY (US); Barin Bhattacharya, Singapore (SG); Jeffrey Willoughby, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 16/781,065

(22) Filed: Feb. 4, 2020

(65) Prior Publication Data
US 2021/0240683 A1 Aug. 5, 2021

(51) Int. Cl.
G06F 16/21 (2019.01)
G06N 5/04 (2023.01)
G06N 20/20 (2019.01)
G06Q 10/20 (2023.01)

(52) U.S. Cl.
CPC ............ G06F 16/217 (2019.01); G06N 5/04 (2013.01); G06N 20/20 (2019.01); G06Q 10/20 (2013.01)

(58) Field of Classification Search
CPC ........ G06F 16/217; G06N 20/20; G06N 5/04; G06Q 10/20
See application file for complete search history.

(56) References Cited

U.S. PATENT DOCUMENTS

| 8,689,333 | B2* | 4/2014 | Aziz | H04L 63/1408 726/24 |
|---|---|---|---|---|
| 2017/0372232 | A1 | 12/2017 | Maughan et al. | |
| 2019/0268214 | A1* | 8/2019 | Maes | G06F 11/008 |
| 2019/0294137 | A1 | 9/2019 | Kawanoue et al. | |
| 2019/0303666 | A1* | 10/2019 | Summers | G06N 7/005 |
| 2020/0250305 | A1* | 8/2020 | Pendyala | G06F 16/1748 |

FOREIGN PATENT DOCUMENTS

WO 2013034448 A1 3/2013

OTHER PUBLICATIONS

Tuncer et al., "Diagnosing performance variations in HPC applications using machine learning", In International Supercomputing Conference, Jun. 2017, pp. 355-373.

* cited by examiner

Primary Examiner — Azizul Choudhury
(74) Attorney, Agent, or Firm — CANTOR COLBURN LLP; Edward Wixted

(57) ABSTRACT

Aspects of the invention include detecting an anomaly in a database of hardware, firmware, and software events. An exemplary method includes determining whether a previously addressed anomaly is a duplicate of the anomaly, addressing the anomaly according to a state of the previously addressed anomaly based on the previously addressed anomaly being a duplicate of the anomaly, and addressing the anomaly according to machine learning based on the previously addressed anomaly not being the duplicate of the anomaly.

8 Claims, 2 Drawing Sheets

HARDWARE, FIRMWARE, AND SOFTWARE ANOMALY HANDLING BASED ON MACHINE LEARNING

BACKGROUND

The present invention generally relates to problem tickets generated for machines, and more specifically, to hardware, firmware, and software anomaly handling based on machine learning.

Problem tickets are generated to report anomalies identified in machines such as prototype machines, for example. The anomalies can involve the hardware, firmware, or software of a machine and, thus, may implicate a hardware repair or a software patch. A problem ticket is provided to a developer. The developer can determine that the issue was not a real problem requiring a fix or can develop a fix. While the developer is examining the problem ticket, its status is indicated as open, and when the developer has made a determination or a fix regarding the anomaly, the problem ticket is indicated as being closed.

SUMMARY

Embodiments of the present invention are directed to hardware, firmware, and software anomaly handling based on machine learning. A non-limiting example computer-implemented method includes detecting an anomaly in a database of hardware, firmware, and software events, and determining whether a previously addressed anomaly is a duplicate of the anomaly. The method also includes addressing the anomaly according to a state of the previously addressed anomaly based on the previously addressed anomaly being a duplicate of the anomaly, and addressing the anomaly according to machine learning based on the previously addressed anomaly not being the duplicate of the anomaly.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, problem tickets facilitate reporting and subsequently addressing anomalies encountered in running hardware, firmware, or both in a machine. Prior approaches involve problem creation and verification, but this approach is manually intensive and the quality of created problems is error prone and non-uniform. The experience level of the writer ultimately determines the problem creation process. Embodiments of the present invention relate to hardware, firmware, and software anomaly handling based on machine learning. The processes are automated and not subject to human experience or expertise. For a given detected anomaly, a determination is made of whether the anomaly has been encountered before. This information aids in addressing the anomaly. Machine learning is used to determine whether a new problem ticket should be opened.

Figure 1:
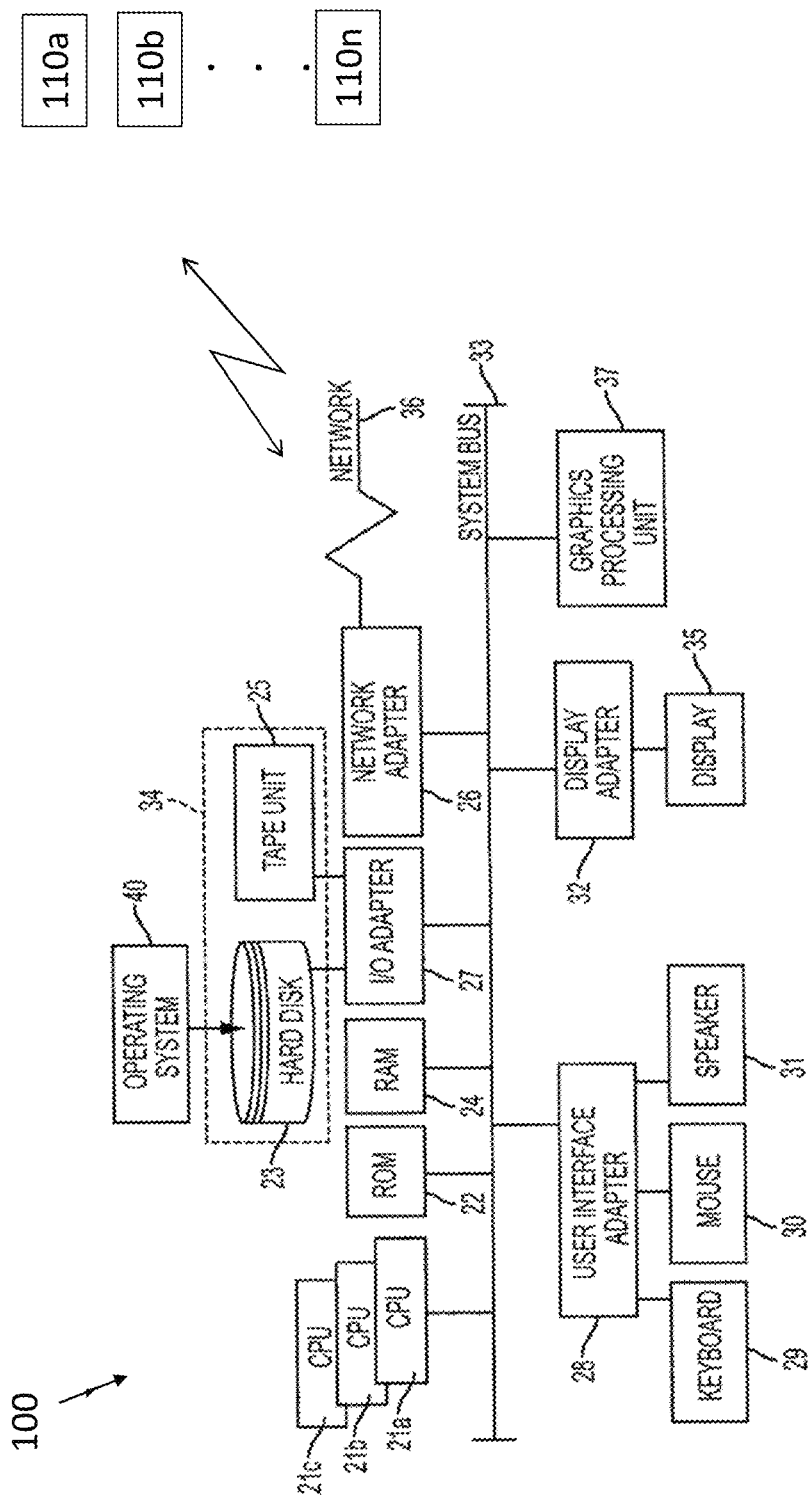
FIG. 1 is a block diagram of a system to perform hardware, firmware, and software anomaly handling based on machine learning according to embodiments of the invention.

FIG. 1 is a block diagram of a system 100 to perform hardware, firmware, and software anomaly handling based on machine learning according to embodiments of the invention. The system 100 can communicate with machines 110a through 110n (e.g., prototype machines) to record events, detect, anomalies, and take actions as detailed with reference to FIG. 2. The communication can be via the network adapter 26, for example. The system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the system 100. A network adapter 26 interconnects system bus 33 with an outside network 36 enabling the system 100 to communicate with other such systems 100.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, the system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, the system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in the system 100.

Figure 2:
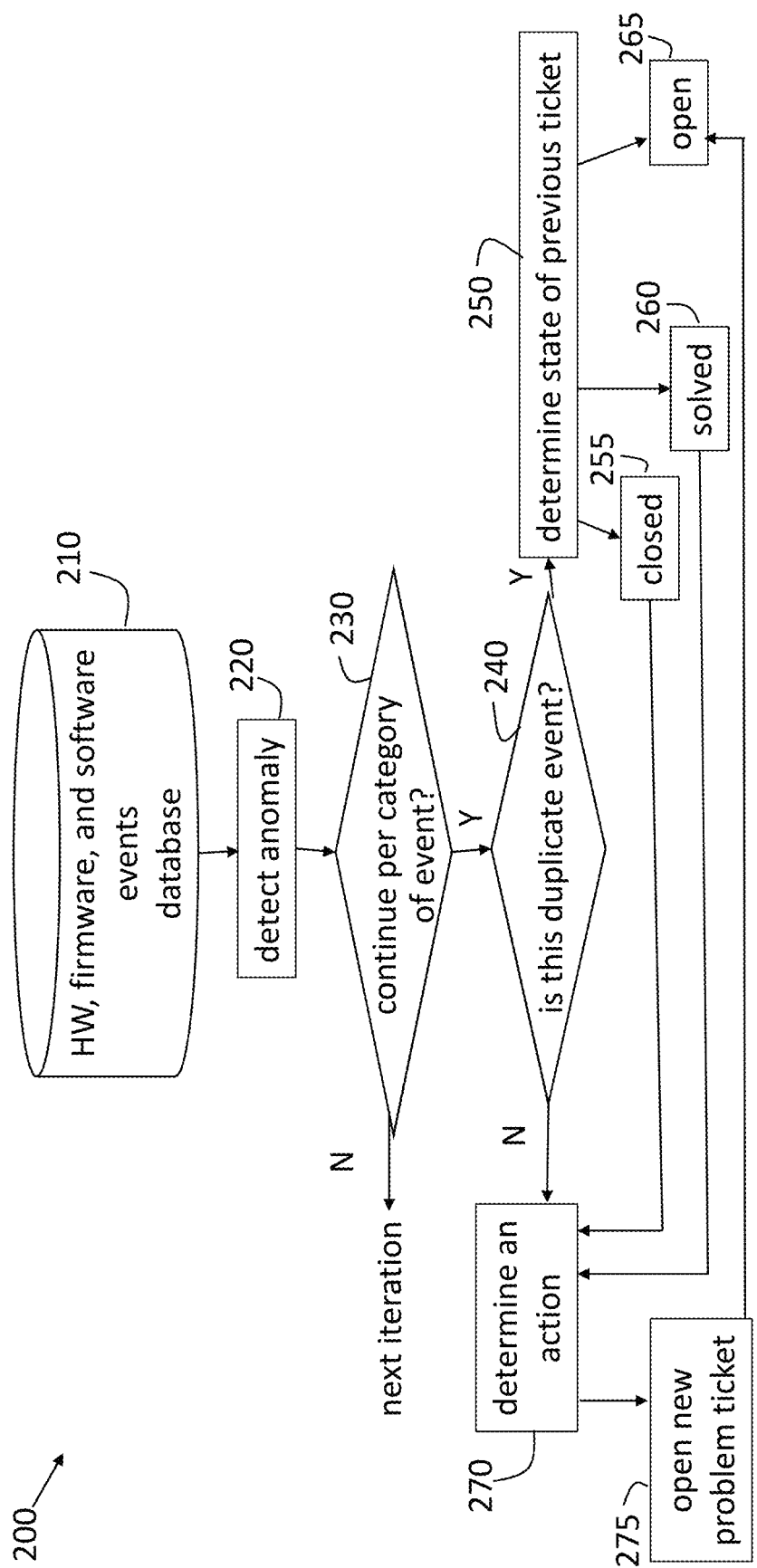
FIG. 2 is a process flow of a method of performing hardware, firmware, and software anomaly handling based on machine learning according to one or more embodiments of the invention.

FIG. 2 is a process flow of a method 200 of performing hardware, firmware, and software anomaly handling based on machine learning according to one or more embodiments of the invention. At block 210, a database of hardware, firmware, and software events is populated as one or more machines 110 are operated. The database can be stored in the system 100 or can be accessible to the system 100 via the network adapter 26, for example. The events can be categorized in the database using a reference code. Thus, a given event entry in the database can include a reference code, reference code description, and an indication of firmware level (i.e., driver) among other information. Event categories can include information and error. An exemplary informational event indicates that the processing unit went into a disabled wait state. An exemplary error event indicates that a network messaging monitor has detected a failure in the service element at a particular position.

At block 220, detecting an anomaly among the events of the database (at block 210) can involve an ensemble machine learning model. An anomaly is generally any non-standard or unexpected output of an operation or behavior of the hardware. An anomaly can be an event of any category. Supervised learning is used to train the ensemble machine learning model based on prior human-made decisions regarding the identification of an event as an anomaly. The ensemble machine learning model includes three components: a rule-based model, deep learning model, and random forest classifier. A binary decision (i.e., anomaly or not) is made by each of the three components, and the decision of all three of the components is used to detect an anomaly at block 220 by a majority vote (i.e., the decision that is reached by at least two of the three components is adopted) according to an exemplary embodiment.

According to alternate embodiments, other schemes can use the decision of three or fewer of the components differently. At block 230, a determination is made as to whether to continue based on the category of the event. That is, an event from the database (at block 210) can be detected as an anomaly (at block 220) but may not necessitate continuing with the anomaly handling. An example is an anomaly that is an informational event. Such an event may lead to continuing examination of the database (at block 210) for the next iteration, as indicated. According to an alternate embodiment, the processes at block 230 may not be needed because every anomaly is addressed.

At block 230, if it is determined that the processes should continue based on the category of the event that was detected as an anomaly (at block 220), then a check is done, at block 240, of whether the event is a duplicate. That is, a determination is made at block 240 of whether the anomaly detected at block 220 has been encountered before. An anomaly (detected at block 220) is a duplicate of a previously processed anomaly if the two anomalies have the same reference code, the same reference code description, and the same firmware level. If the anomaly (from block 220) has a duplicate (according to block 230), then the state of the previous problem ticket generated for the duplicate event is determined, at block 250. The state of the previous ticket generated for the duplicate event can be closed (at block 255), solved (at block 260), or open (at block 265). A previous ticket can be closed without being solved or can be closed and solved.

Closed (at block 255) indicates that the previous ticket may have been deemed not to be an anomaly requiring a fix at all. In this case, the previous ticket is closed but not solved. An anomaly (detected at block 220) with a duplicate (according to the check at block 240) that is closed (at block 255) may result in a notification to an operator regarding the closed status. No further action is required for the anomaly. Solved (at block 260) indicates that a resolution was found for the duplicate anomaly indicated in the previous ticket. If the anomaly is related to firmware or software, the resolution may have been included in the next version of the program code. Thus, for the current anomaly (detected at block 220), the version of the program code may be checked to ensure that the version including the resolution for the previous (duplicate) anomaly is being used. If the determination (at block 250) is that the previous ticket is closed (at block 255) or solved (at block 260), then this information is also provided to the machine learning process that is part of block 270, as indicated. Open (at block 265) indicates that the previous ticket for the duplicate event is still being worked on. In this case, information from the current anomaly (detected at block 220) can be added to the data for the previous ticket to aid in the resolution of that previous ticket.

Determining the action, at block 270, involves a machine learning process and is used to determine what to do with an anomaly (detected at block 220) for which there is no duplicate (previously handled) event (at block 240). As indicated in FIG. 2, the training set for the machine learning at block 270 includes information about previous problem tickets such as the ticket number or other identifier, the machine 110 at which the anomaly occurred, and the time offset of the anomaly that generated the ticket. The time offset refers to the time, relative to the start of a test or program run, at which the anomaly addressed by the problem ticket occurred. The training data set also includes the reference code of the anomaly addressed by each input prior problem ticket, and the disposition of the previous problem ticket as open, closed, or solved. The reference code includes a code and code extension. The machine learning essentially results in identifying a previously handled anomaly that, while not being a duplicate, is most similar to the anomaly identified at block 220 so that the disposition of that similar anomaly informs the next action to be taken for the anomaly identified at block 220. A similar (but not duplicate) anomaly will have the same code portion of the reference code but not necessarily the same code extension portion and will also have a time offset within a threshold difference of the time offset of the similar anomaly on the same machine 110.

As an output of block 270, the information about previous similar anomalies can aid in the determination of what to do about a newly encountered (non-duplicate) anomaly. For example, information about the current anomaly may be added to the ticket number or other identifier of a previous similar anomaly, or a fix resulting from the previous anomaly can be applied. As another example, at block 275, a new problem ticket may be opened as one of the options of how to handle a non-duplicate anomaly. Part of the processing at block 275 can include specifying where to direct the new ticket (e.g., specifying the type of fix needed). Other options (at block 270) include closing the issue after issuing information to an operator. If a new problem ticket is opened (at block 275), that information is provided at block 265 so that relevant information can be added to any other open tickets.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting an anomaly in a database of hardware, firmware, and software events that include error events, wherein the anomaly is an unexpected event;
    determining whether a previously addressed anomaly is a duplicate of the anomaly;
    addressing the anomaly according to a state of the previously addressed anomaly based on the previously addressed anomaly being a duplicate of the anomaly, wherein the state is one of an open state, a solved state and closed state;
    based on a determination that the state is the solved state, ensuring that a version of the firmware or software that includes a solution to the previously addressed anomaly is being used;
    based on a determination that the state is the open state, adding data regarding the anomaly to a problem ticket of the previously addressed anomaly; and
    addressing the anomaly according to machine learning based on the previously addressed anomaly not being the duplicate of the anomaly,
    wherein the detecting the anomaly in the database includes using an ensemble machine learning model and wherein the addressing the anomaly according to the state of the previously addressed anomaly includes providing a message to an operator based on the state being the closed state.

2. The computer-implemented method according to claim 1, further comprising recording the hardware, firmware, and software events resulting from operation of prototype machines in the database.

3. The computer-implemented method according to claim 1, wherein the addressing the anomaly according to machine learning includes opening a new problem ticket indicating the anomaly.

4. A system comprising:
    a memory having computer readable instructions; and
    one or more processors for executing the computer readable instructions, the computer readable instructions controlling the one or more processors to perform operations comprising:
        detecting an anomaly in a database of hardware, firmware, and software events that include error events, wherein the anomaly is an unexpected event;
        determining whether a previously addressed anomaly is a duplicate of the anomaly;
        addressing the anomaly according to a state of the previously addressed anomaly based on the previously addressed anomaly being a duplicate of the anomaly, wherein the state is one of an open state, a solved state and closed state;
        based on a determination that the state is the solved state, ensuring that a version of the firmware or software that includes a solution to the previously addressed anomaly is being used;
        based on a determination that the state is the open state, adding data regarding the anomaly to a problem ticket of the previously addressed anomaly; and
        addressing the anomaly according to machine learning based on the previously addressed anomaly not being the duplicate of the anomaly,
        wherein the detecting the anomaly in the database includes using an ensemble machine learning model and wherein the addressing the anomaly according to the state of the previously addressed anomaly includes providing a message to an operator based on the state being the closed state.

5. The system according to claim 4, further comprising recording the hardware, firmware, and software events resulting from operation of prototype machines in the database.

6. The system according to claim 4, wherein the addressing the anomaly according to machine learning includes opening a new problem ticket indicating the anomaly.

7. A computer program product comprising a computer readable storage medium having program instructions embodied therewith, the program instructions executable by a processor to cause the processor to perform operations comprising:
    detecting an anomaly in a database of hardware, firmware, and software events that include error events, wherein the anomaly is an unexpected event;
    determining whether a previously addressed anomaly is a duplicate of the anomaly;
    addressing the anomaly according to a state of the previously addressed anomaly based on the previously addressed anomaly being a duplicate of the anomaly, wherein the state is one of an open state, a solved state and closed state;
    based on a determination that the state is the solved state, ensuring that a version of the firmware or software that includes a solution to the previously addressed anomaly is being used;
    based on a determination that the state is the open state, adding data regarding the anomaly to a problem ticket of the previously addressed anomaly; and
    addressing the anomaly according to machine learning based on the previously addressed anomaly not being the duplicate of the anomaly,
    wherein the detecting the anomaly in the database includes using an ensemble machine learning model and wherein the addressing the anomaly according to the state of the previously addressed anomaly includes providing a message to an operator based on the state being the closed state.

8. The computer program product according to claim 7, wherein the addressing the anomaly according to machine learning includes opening a new problem ticket indicating the anomaly.

* * * * *